United States Patent [19]
Kazita et al.

[11] Patent Number: 4,723,575
[45] Date of Patent: Feb. 9, 1988

[54] SOLENOID VALVE

[75] Inventors: Hidenobu Kazita; Toshiharu Naito, both of Okazaki; Yoshiyuki Hattori, Toyoake; Yoshihisa Nomura, Toyota, all of Japan

[73] Assignees: Nippondenso Co., Ltd., Kariya; Toyota Jidosha Kabushiki Kaisha, Toyota, both of Japan

[21] Appl. No.: 14,519

[22] Filed: Feb. 13, 1987

[30] Foreign Application Priority Data

Feb. 21, 1986 [JP] Japan ................................ 61-37684

[51] Int. Cl.$^4$ ............................................ F16K 31/06
[52] U.S. Cl. ..................................... 137/883; 137/864; 137/870; 137/879; 251/84; 251/129.21; 60/591
[58] Field of Search ............... 137/862, 864, 870, 871, 137/878, 879, 882, 883; 251/84, 85, 129.19, 129.2, 129.21; 60/591

[56] References Cited
U.S. PATENT DOCUMENTS 4,338,966 7/1982 Smith .................. 251/129.2 X
4,561,701 12/1985 Fujii et al. ................. 137/870 X
4,674,540 6/1987 Takei et al. ............... 251/129.21 X

FOREIGN PATENT DOCUMENTS 58-48372 10/1983 Japan .

Primary Examiner—A. Michael Chambers
Assistant Examiner—John C. Fox
Attorney, Agent, or Firm—Cushman, Darby & Cushman

[57] ABSTRACT

First and second outlet ports are connected to an inlet port. A first valve member selectively blocks and unblocks the first outlet port. A second valve member selectively blocks and unblocks the second outlet port. A first device urges the first valve member. A second device urges the second valve member. A movable member disposed between the first and second valve members allows a force of the first urging device to travel to the second valve member. The movable member can be driven by a solenoid winding. When the solenoid winding is deenergized, the first valve member is moved to its open position by the first urging device and the second valve member is moved against a force of the second urging device to its open position by the first urging device. When the solenoid winding is energized, the first valve member is moved against the force of the first urging device to its closed position by the movable member and the second valve member is moved to its closed position by the second urging device.

7 Claims, 4 Drawing Figures (a)

(b)

SOLENOID VALVE

BACKGROUND OF THE INVENTION

1. Field of the Invention

This invention relates to a solenoid or electromagnetic valve, and particularly to a solenoid valve which can block and unblock at least two ports or passages.

2. Description of the Prior Art

Japanese published examined patent application No. 58-48372 discloses an automotive antiskid control system including a hydraulic arrangement which has a single hydraulic pressure source and plural hydraulic pressure consumption elements such as hydraulic actuators. The hydraulic pressure consumption elements are selectively connected to and disconnected from the common hydraulic pressure source via a plurality of separate valves. These separate valves together occupy or need a large space.

SUMMARY OF THE INVENTION

It is an object of this invention to provide a compact solenoid valve which can block and unblock at least two ports or passages.

In accordance with a first aspect of this invention, a solenoid valve has an inlet port, and first and second outlet port connected to the inlet port. The first and second outlet ports extend along a common axis and oppose each other. A first valve member is movable between a closed position and an open position. The first valve member blocks and unblocks the first outlet port when the first valve member is in its closed position and open position respectively. A second valve member is movalbe between a closed position and an open position. The second valve member blocks and unblocks the second outlet port when the second valve member is in its closed position and open position respectively. A direction of movement of the second valve member from its closed position to its open position is similar to a direction of movement of the first valve member from its closed position to its open position. A first device urges the first valve member toward its open position and also toward the second valve member. A second device urges the second valve member toward its closed position and also toward the first valve member by a force weaker than a force of the first urging device. A movable member disposed between the first and second valve members can move along the above-mentioned axis. The movable member allows the force of the first urging device to travel to the second valve member. A solenoid winding generates an electromagnetic force when it is electrically energized. This electromagnetic force attracts the movable member in a direction of moving the first valve member toward its closed position. When the solenoid winding is electrically de-energized, the first valve member is moved to its open position by the force of the first urging device and the second valve member is moved against the force of the second urging device to its open position by the force of the first urging device which travels to the second valve member through the movable member. When the solenoid winding is electrically energized, the first valve member is moved against the force of the first urging device to its closed position by the movable member and the second valve member is moved to its closed position by the force of the second urging device.

In accordance with a second aspect of this invention, a solenoid valve has a body formed with a first port and a second port. A first valve member is movable between a first position and a second position, and selectively blocks and unblocks the first port in accordance with movement of the first valve member between its first and second positions. A second valve member is movable between a first position and a second position, and selectively blocks and unblocks the second port in accordance with movement of the second valve member between its first and second positions. A first device urges the first valve member toward its first position and thereby normally holds the first valve member in its first position. A second device urges the second valve member toward its second position. The first urging device is allowed to urge the second valve member toward its first position and thereby to normally hold the second valve member in its first position against a force of the second urging device. An electromagnetic actuator connected to the first valve member can move the first valve member from its first position to its second position against a force of the first urging device. When the electromagnetic actuator moves the first valve member from its first position to its second position, the second valve member is relieved from the force of the first urging device so that the second valve member is moved from its first position to its second position by the second urging device.

DESCRIPTION OF THE PREFERRED EMBODIMENT

Figure 1:
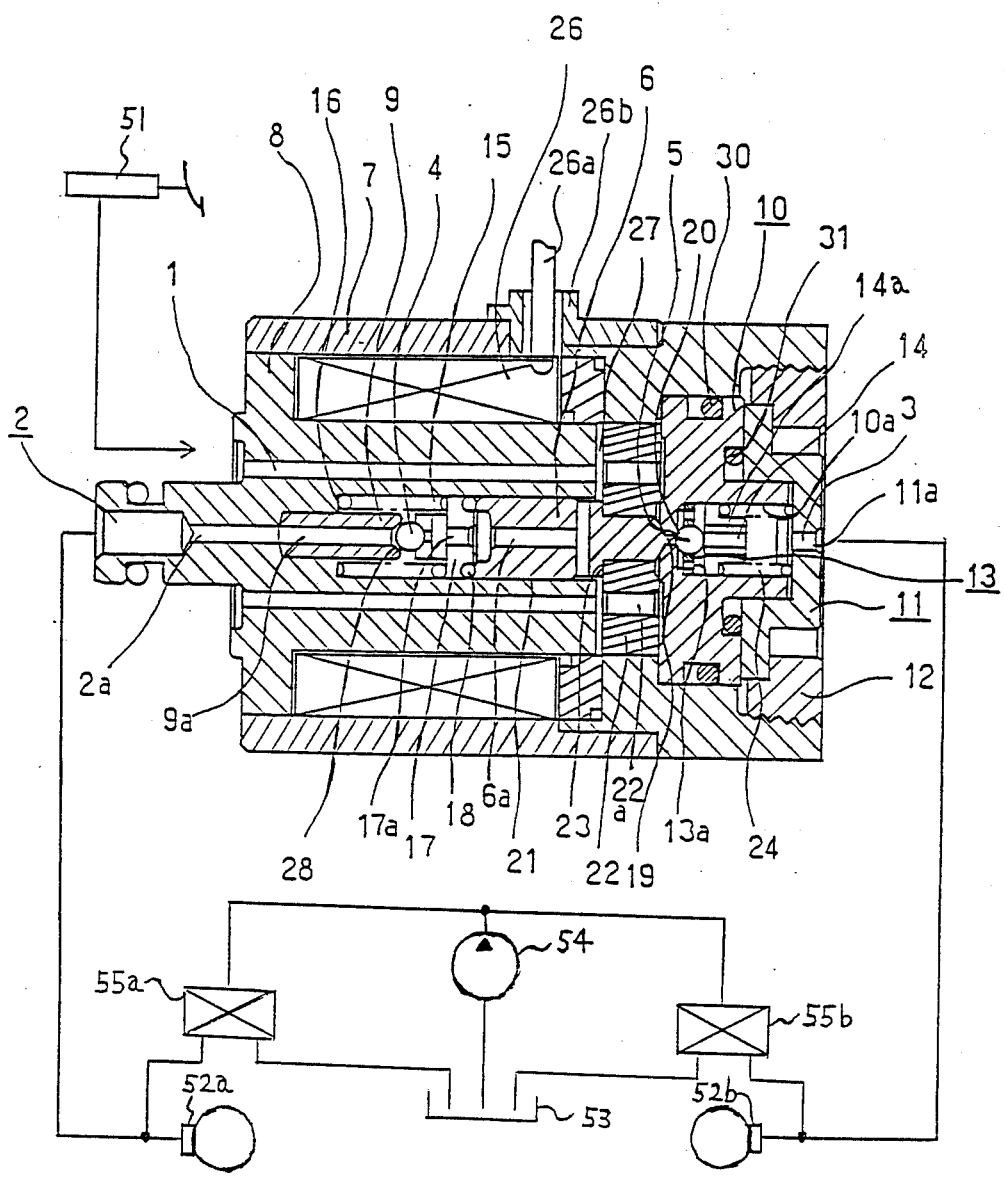
FIG. 1 is a sectional view of a solenoid valve according to an embodiment of this invention.

With reference to FIG. 1, a solenoid or electromagnetic valve has a body formed with an inlet port or ports 1, a first outlet port 2, and a second outlet port 3. The inlet port 1 leads to the first and second outlet ports 2 and 3. The first and second outlet ports 2 and 3 extend along a common axis and oppose each other. An upstream end of the inlet port 1 forms an inlet opening which is preferably connected to a hydraulic pressure source. Downstream ends of the first and second outlet ports 2 and 3 form first and second outlet openings which are preferably connected to separate hydraulic pressure consumption elements such as hydraulic actuators, respectively.

Specifically, the inlet port 1 is generally connected to a master cylinder 51 of an automotive braking system. The first outlet port 2 is generally connected to a wheel cylinder 52a of the braking system. The second outlet port 3 is generally connected to a wheel cylinder 52b of the braking system. The wheel cylinder 52a leads to a switching valve 55a which is connected to an oil reservoir 53 and the outlet of a hydraulic pump 54. The inlet of the pump 54 is connected to the reservoir 53. The switching valve 55a is movable between a first position and a second position. When the switching valve 55a assumes the first position, the wheel cylinder 52a is connected to the outlet of the pump 54 and is disconnected from the reservoir 53. When the switching valve 55a assumes the second position, the wheel cylinder 52a is connected to the reservoir 53 and is disconnected from the outlet of the pump 54. The wheel cylinder 52b leads to a switching valve 55b which is connected to the reservoir 53 and the outlet of the pump 54. The switching valve 55b is movable between a first position and a second position. When the switching valve 55b assumes the first position, the wheel cylinder 52b is connected to the outlet of the pump 54 and is disconnected from the reservoir 53. When the switching valve 55b assumes the second position, the wheel cylinder 52b is connected to the reservoir 53 and is disconnected from the outlet of the pump 54.

The first outlet port 2 is selectively blocked and unblocked by a first movable valve member or ball 4. When the first outlet port 2 is blocked and unblocked, the related first outlet opening is disconnected from and connected to the inlet opening, respectively. The second outlet port 3 is selectively blocked and unblocked by a second movable valve member or ball 5. When the second outlet port 3 is blocked and unblocked, the related second outlet opening is disconnected from and connected to the inlet opening, respectively. The first and second valve members 4 and 5 are driven by an electromagnetic actuator including a movable member or armature 6 disposed between the valve members 4 and 5. As will be described hereinafter, when the armature 6 is in a normal position shown in FIG. 2(a), both the outlet ports 2 and 3 are connected to the inlet opening. When the armature 6 is in an activated position shown in FIG. 2(d), both the outlet ports 2 and 3 are blocked by the valve members 4 and 5 so that both the outlet openings are disconnected from the inlet opening.

The solenoid valve body includes a tubular casing 7 which securely accommodates a first port member 8 extending axially with respect to the casing 7 and being approximately in the form of a cylinder. The first outlet port 2 is formed by a central axial hole 2a in the first port member 8 and a central hole 9a of a tube 9 coaxially fixed at an end of the hole 2a. The armature 6 is disposed in the first port member 8.

A second port member 10 in the form of a ring is fixedly disposed in the first port member 8. An end face of the second port member 10 is supported by a plug or cap 11 which is fixedly held by an annular attachment member 12 secured to the first port member 8 via threads.

An axial hole 10a extends through the center of the second port member 10. The second valve member 5, a valve guide member 13, a support member 14, and a helical spring 24 are disposed in the hole 10a. The inner surface of the second port member 10 defining the hole 10a is formed with an annular valve seat 20. As the valve member 5 moves between a closed position and an open position, the valve member 5 contacts with and separates from the valve seat 20. When the valve member 5 contacts with and separates from the valve seat 20, the second outlet port 3 is blocked and unblocked respectively. The valve member 5 is received by the valve guide member 13. The valve guide member 13 is in the form of a disc, fitting within the second port member 10. The valve guide member 13 has axial holes 13a distributed about the axis thereof. The support member 14 is in the form of a cylinder, slideably fitting within the second port member 10. The support member 14 has axial holes 14a distributed about the axis thereof. The second outlet port 3 is formed by the hole 10a in the second port member 10, the holes 13a in the valve guide member 13, the holes 14a in the support member 14, and a central axial hole 11a in the cap 11.

The inlet port or ports 1 extend axially in the first port member 8. The inlet ports 1 lead to upstream part of the first outlet port 2 via a gap 27 in the first port member 8, a diametrical passage (no reference character) in the armature 6, a central axial passage 6a in the armature 6, and a central axial passage 17a in a support member or disc 17. The inlet ports 1 also lead to upstream part of the second outlet port 3 via axial passages 22a in a magnetic member 22 and radial grooves (no reference character) in the second port member 10.

The first valve member 4, the tube 9, the support member 17, and a helical spring 15 are disposed within an axial bore in the first port member 8. The support member 17 can slide axially relative to the first port member 8. The support member 17 holds the first valve member 4 so that the valve member 4 moves together with the support member 17. An end of the tube 9 opposing the valve member 4 defines an annular valve seat 28 extending around the end of the central hole 9a. As the valve member 4 moves between a closed position and an open position, the valve member 4 contacts with and separates from the valve seat 28. When the valve member 4 contacts with and separates from the valve seat 28, the first outlet port 2 is blocked and unblocked respectively. The first port member 8 defines a spring seat 16 extending around the tube 9. The spring 15 is provided between the spring seat 16 and the support member 17 to urge the valve member 4 and the support member 17 in the direction away from the valve seat 28, that is, in the direction toward the open position of the valve member 4.

The spring 15 exerts an urging force on the armature 6 via centering balls 18 provided between the support member 17 and the armature 6. An end of the armature 6 has a projection 19 able to contact the second valve member 5. When the projection 19 is in contact with the second valve member 5, the force of the spring 15 travels to the second valve member 5 via the support member 17 and the armature 6 and thus urges the second valve member 5 in the direction away from the valve seat 20, that is, in the direction toward the open position of the valve member 5.

The armature 6 slideably fits in a guide bore 21 extending along the axis of the first port member 8. The armature 6 can move axially along the guide bore 21.

The magnetic member 22 is in the form of a ring, securely fitting around the armature 6. The armature 6 moves together with the magnetic member 22. The magnetic member 22 abuts an annular shoulder 23 on the armature 6. The magnetic member 22 can move axially while abutting the shoulder 23. A gap or clearance 27 between the magnetic member 22 and the first port member 8 allows the axial movement of the magnetic member 22 toward the tube 9.

The spring 24 is seated between the cap 11 and the support member 14. The support member 14 is held in contact with the valve member 5 by the force of the spring 24. The spring 24 urges the valve member 5 via the support member 14 in the direction toward the valve seat 20, that is, in the direction toward the closed position of the valve member 5. It should be noted that the valve member 5 is normally urged by the spring 15 in the direction away from the valve seat 20, that is, in the direction toward the open position of the valve member 5. The force of the spring 15 is normally greater than the force of the spring 24, so that the valve member 5 normally separates from the valve seat 20 and thus the second outlet port 3 is normally unblocked.

A solenoid winding or windings 26 securely provided around the first port member 8 are electrically connected to an electric power source (not shown) via a control switch (not shown). The electrical connection between the solenoid windings 26 and the electric power source includes leads 26a supported on the casing 7 by a clamper 26b. Operation of this switch allows the solenoid windings 26 to be electrically energized and de-energized. The solenoid windings 26 extend leftward of the magnetic member 22 as viewed in FIG. 1. When the solenoid windings 26 are electrically energized, the magnetic member 22 is attracted and moved leftward as vied in FIG. 1 while displacing the armature 6 together therewith and remaining in contact with the shoulder 23 on the armature 6.

An O-ring 30 provided between the first port member 8 and the second port member 10 maintains seal between the members 8 and 10. Another O-ring 31 provided between the second port member 10 and the cap 11 maintains seal between the members 10 and 11.

It should be noted that the armature 6 and the magnetic member 22 may be integral with each other and be made of common magnetic material.

In operation, when the solenoid windings 26 are electrically de-energized, the first valve member 4 is separated from the valve seat 28 by the force of the spring 15 so that the first outlet port 2 is unblocked as shown in FIG. 2(a). During the de-energization of the solenoid windings 26, the force travels from the spring 15 to the second valve member 5 via the armature 6 and thereby the second valve member 5 is separated from the valve seat 20 against the force of the spring 24 so that the second outlet port 3 is also unblocked as shown in FIG. 2(a). It should be noted that the force of the spring 15 is normally stronger than the force of the spring 24.

Figure 2:
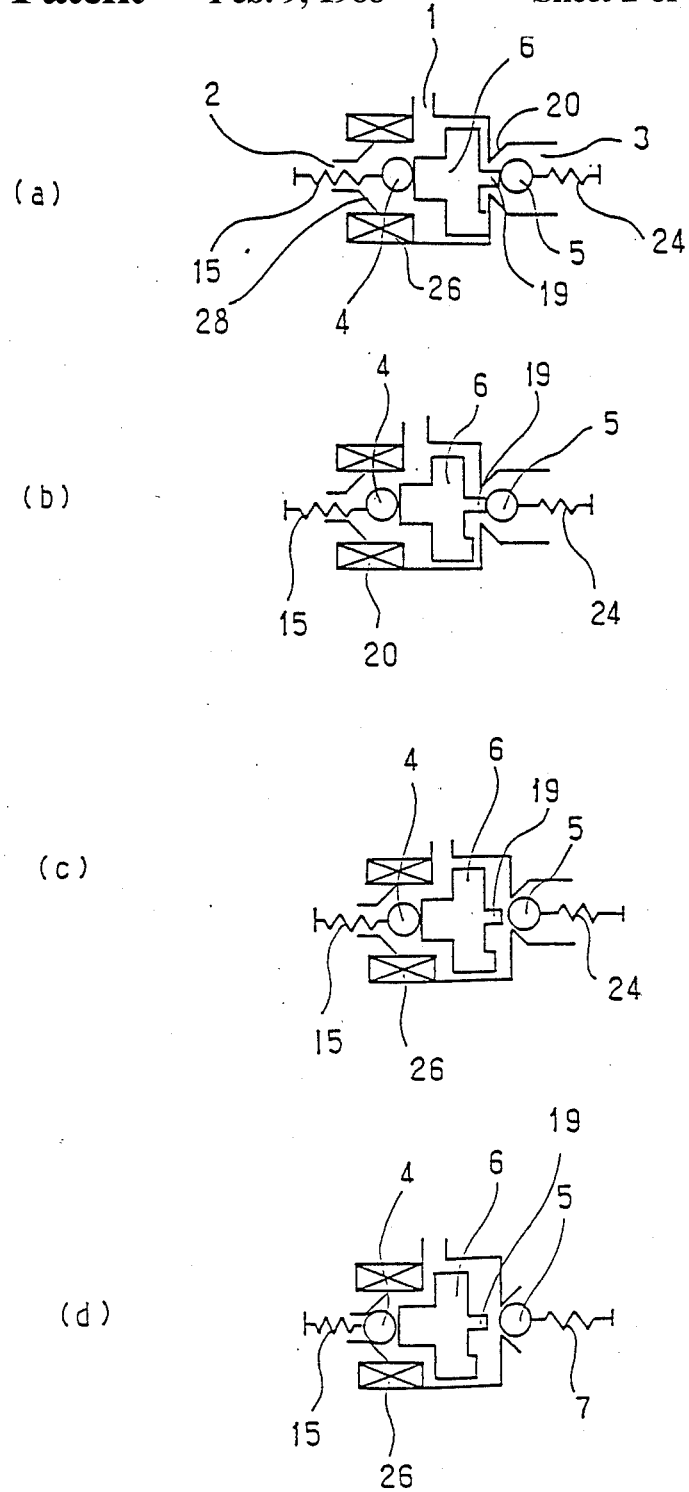
FIGS. 2 (a), 2(b), 2(c), and 2(d) are diagrammatic views of a portion of the solenoid valve of FIG. 1 in four different positions.

During an initiation of energization of the solenoid windings 26, the armature 6 moves from the normal position of FIG. 2(a) to a position of FIG. 2(b). In the state of FIG. 2(b), the first outlet port 2 is still unblocked and the second outlet port 3 is also unblocked, since the projection 19 of the armature 6 still contacts the second valve member 5. During the initiation of the energization of the solenoid windings 26, the electromagnetic force by the solenoid winding 26 and the mechanical force by the spring 24 move the armature 6 leftward as viewed in FIG. 2 against the force of the spring 15. During this period, the force of the spring 24 facilitates the movement of the armature 6. This assist by the spring 24 allows easier movement of the armature 6 in comparison with a case where the armature 6 is moved only by the electromagnetic force of the solenoid windings 26. Although the inductance of the solenoid windings 26 prevents an abrupt increase in the generated electromagnetic attracting force upon the energization of the solenoid windings 26, the assisting force by the spring 24 allows the armature 6 to start moving within an extremely short time from the energization of the solenoid windings 26. This results in quick response characteristics of the solenoid valve.

During the initiation of the energization of the solenoid windings 26, the armature 6 advances from the position of FIG. 2(b) to a position of FIG. 2(c). In the state of FIG. 2(c), the projection 19 of the armature 6 separates from the second valve member 5 and thus the force of the spring 15 does not travel to the second valve member 5 so that essentially only the force of the spring 24 acts on the valve member 5. In the state of FIG. 2(c), the second valve member 5 is held in contact with the valve seat 20 by the force of the spring 24 so that the second outlet port 3 is blocked. In the state of FIG. 2(c), the first valve member 4 still separates from the valve seat 28 so that the first outlet port 2 continues to be unblocked. After the projection 19 of the armature 6 separates from the second valve member 5, the assiting force by the spring 24 does not act on the armature 6. In the state of FIG. 2(c), the armature 6 approaches the solenoid windings 26 and the gap 27 is decreased so that the electromagnetic attracting force by the solenoid windings 26 is adequately enhanced. This enhanced attracting force by the solenoid windings 26 allows easy movement of the armature 6 against the force of the spring 15 without any assisting force from the spring 24.

During the initiation of the energization of the solenoid windings 26, the armature 6 moves from the position of the FIG. 2(c) to an activated position of FIG. 2(d). In the state of FIG. 2(d), the first valve member 4 contacts the valve seat 28 so that the first outlet port 2 is blocked. In this case, the electromagnetic attracting force by the solenoid windings 26 enables the armature 6 to hold the first valve member 4 in contact with the valve seat 28. In the state of FIG. 2(d), the spring 24 continues to hold the second valve member 5 in contact with the valve seat 20 so that the second outlet port 3 remains blocked.

Figure 3:
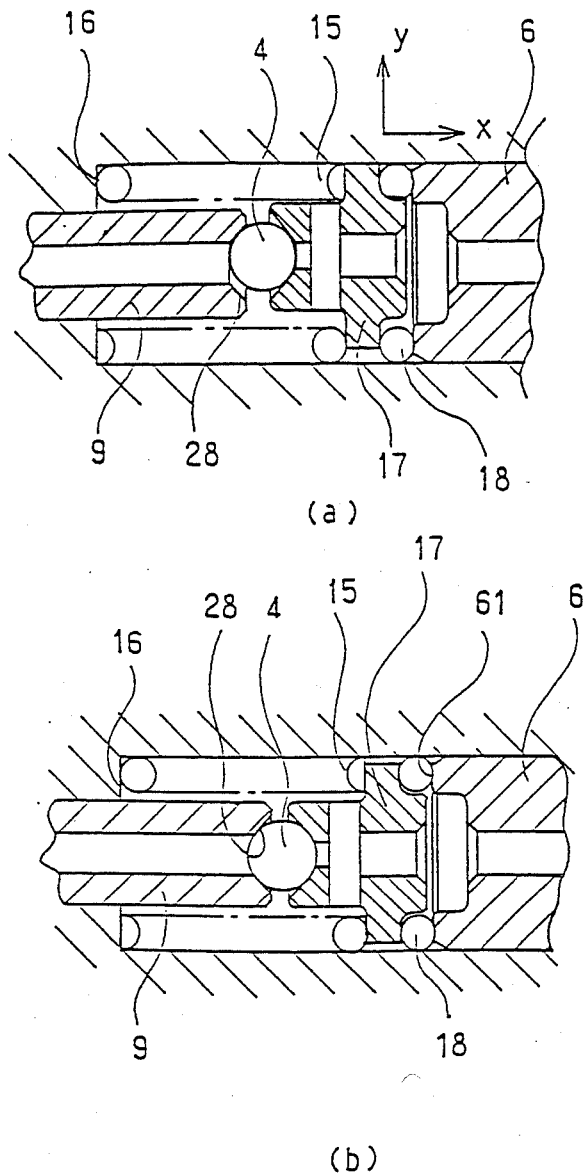
FIGS. 3(a) and 3(b) are sectional views of a portion of the solenoid valve of FIG. 1.

The centering balls 18 operate as follows. When the first valve member 4 is brought into contact with the valve seat 28 on the tube 9, an axis of the valve member 4 is often out of alignment with the axis of a tapered or cone surface of the valve seat 28, as shown in FIG. 3(a). In this case, rolling action of the centering balls 18 allows the support member 17 to move radially along an end face 61 of the armature 6 so that the valve member 4 moves together with the support member 17 into a position where an axis of the valve member 4 aligns with the axis of the cone surface of the valve seat 28, as shown in FIG. 3(b). In this way, the first valve member 4 is automatically centered with respect to the valve seat 28 by the balls 18 centered with respect to the valve seat 28 by the balls 18 upon movement of the valve member 4 into contact with the valve seat 28. When the first valve member 4 contacts the valve seat 28 and simultaneously the axis of the valve member 4 aligns with the axis of the valve seat 28, the first outlet port 2 is reliably blocked.

Figure 4:
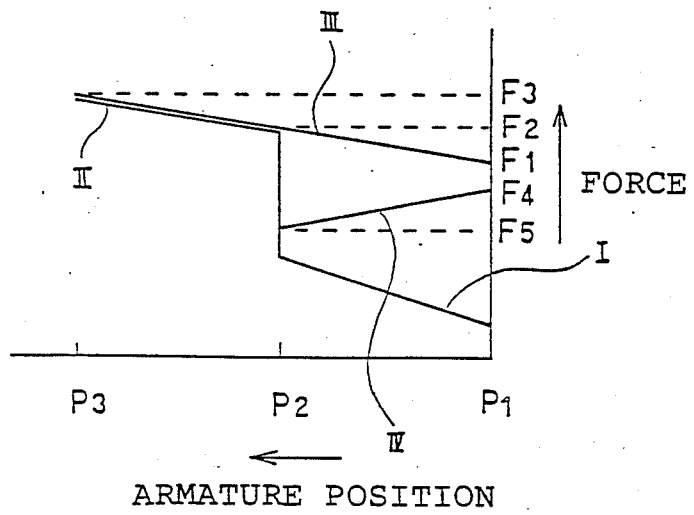
FIG. 4 is a diagram showing the relationship between the position of the armature and forces exerted on the armature in the solenoid valve of FIG. 1.

FIG. 4 shows the relationship between the leftward displacement of the armature 6 as viewed in FIG. 1 and desired forces exerted on the armature 6. FIG. 4 also shows the relationship between the displacement of the armature 6 and the forces of the springs 15 and 24. In FIG. 4, the characters P1 and P3 denote a normal position and an activated position of the armature 6 respectively. It should be noted that when the solenoid windings 26 are de-energized and energized, the armature 6 finally moves to the normal position and the activated position respectively. In FIG. 4, the character P2 denotes a preset position of the armature 6 between the normal and activated positions P1 and P3. At the present position P2, the projection 19 of the armature 6 moves out of contact with the second valve member 5.

In FIG. 4, the line I represents a force necessary to displace the armature 6 in the case where the armature 6 is in a position between the points P1 and P2. When the armature 6 resides between the positions P1 and P2, the armature 6 is subjected to both the forces of the springs 15 and 24. As the armature 6 moves from the position P1 to the position P2, the force of the spring 15 increases from a value F1 to a value F2 along the line III while the force of the spring 24 decreases from a value F4 to a value F5 along the line IV. In the case where the armature 6 is in a position between the points P1 and P2, the force I necessary to displace the armature 6 essentially corresponds to a resultant of the force III of the spring 15 and the force IV of the spring 24.

In FIG. 4, the line II represents a force necessary to displace the armature 6 in the case where the armature 6 resides between the positions P2 and P3. As the armature 6 moves from the position P2 to the position P3, the force of the spring 15 increases from the value F2 to a value F3 along the line III. In the case where the armature 6 resides between the positions P2 and P3, the force of the spring 24 does not act on the armature 6 but the force of the spring 15 acts on the armature 6 so that the force II necessary to displace the armature 6 essentially corresponds to the force III of the spring 15.

The forces of the springs 15 and 24 acting on the armature 6 are chosen as follows. With reference to FIG. 4, the force F3 of the spring 15 is chosen to reliably separate the valve member 4 from the valve seat 28 when the solenoid windings 26 are de-energized. It should be noted that when the valve member 4 is in contact with the valve seat 28 and thus the first outlet port 2 is blocked, the hydraulic pressure source connected to the inlet port 1 exerts an additional static pressure on the valve member 4 in the direction toward the valve seat 28. Accordingly, the force F3 of the spring 15 is chosen to overcome this additional static pressure and thereby to reliably separate the valve member 4 from the valve seat 28 upon the de-energization of the solenoid windings 26.

The force F2 of the spring 15 is chosen to reliably separate the valve member 5 from the valve seat 20 against the force of the spring 24 when the solenoid windings 26 are de-energized. It should be noted that when the valve member 5 is in contact with the valve seat 20 and thus the second outlet port 3 is blocked, the pressure within the hydraulic pressure consumption device connected to the second outlet port 3 induces an additional static pressure which acts on the valve member 5 in the direction toward the valve seat 20. Accordingly, the force F2 of the spring 15 is chosen to overcome the sum of this additional static pressure and the force of the spring 24 and thereby to reliably separate the valve member 5 from the valve seat 20 upon the de-energization of the solenoid windings 26.

The force F5 of the spring 24 is chosen to reliably move the valve member 5 into contact with the valve seat 20 when the solenoid windings 26 are energized. It should be noted that the hydraulic pressure source connected to the inlet port 1 exerts an additional static pressure on the valve member 5 in the direction away from the valve seat 20. Accordingly, the force F5 of the spring 24 is chosen to reliably move the valve member 5 into contact with the valve seat 20 against this static pressure in the case where the projection 19 of the armature 6 separates from the valve member 5.

The force F1 of the spring 15 is set greater than the force F4 of the spring 24 so that the valve members 4 and 5 reliably separate from the valve seats 20 and 28 and thus the outlet ports 2 and 3 are surely unblocked when the solenoid windings 26 are de-energized. The greater force F1 of the spring 15 urges the armature 6 in the rightward direction as viewed in FIG. 1 and also presses the magnetic member 22 against the second port member 10 when the solenoid windings 26 are de-energized.

In the case where the forces necessary to displace the armature 6 are decreased, that is, where the forces of the springs 15 and 24 represented by the lines I and II in FIG. 4 are decreased, the speed of the armature 6 can be increased. In the case where the cross-sectional area of the flow path blocked by valve member 5 is small, the force F5 of the spring 24 can be reduced. This is because a decrease in the cross-sectional area of the flow path blocked by the valve member 5 causes a smaller additional force exerted on the valve member 5 by the pressure differential across the valve member 5. The decrease in the force F5 of the spring 24 allows decreases in the forces F2 and F3 of the spring 15.

The solenoid valve of this embodiment can be easily used as a three-position valve, that is, a valve changeable among three different positions. As understood from FIG. 4, the forces necessary to displace the armature 6 from the position P2 to the position P3 are approximately twice as great as the forces necessary to displace the armature 6 from the position P1 to the position P2. Accordingly, an electromagnetic force generated by the solenoid windings 26 to attract the magnetic member 22 is required to increase abruptly when the armature 6 passes the position P2 toward the position P3. As will be described hereinafter, this characteristic allows the armature 6 to be changeable among three different positions by controlling an electric current through the solenoid windings 26.

When the solenoid windings 26 are de-energized, the armature 6 assumes a normal position shown in FIG. 2(a) where both the first outlet port 2 and the second outlet port 3 are unblocked. When the solenoid windings 26 are supplied with a preset small electric current, the armature 6 assumes an intermediate position shown in FIG. 2(c) where the first outlet port 2 remains unblocked but the second outlet 2 is blocked. When the solenoid windings 26 are supplied with a preset great electric current, the armature 6 assumes a fully displaced position shown in FIG. 2(d) where both the first outlet port 2 and the second outlet port 3 are blocked.

What is claimed is:
1. A solenoid valve comprising:
(a) an inlet port;
(b) first and second outlet ports connected to the inlet port, the first and second outlet ports extending along a common axis and opposing each other;
(c) a first valve member movable between a closed position and an open position, the first valve member blocking and unblocking the first outlet port when the first valve member is in its closed position and open position respectively;
(d) a second valve member movable between a closed position and an open position, the second valve member blocking and unblocking the second outlet port when the second valve member is in its closed position and open position respectively, a direction of movement of the second valve member from its closed position to its open position being similar to a direction of movement of the first valve member from its closed position to its open position;

(e) first urging means for urging the first valve member toward its open position and also toward the second valve member;

(f) second urging means for urging the second valve member toward its closed position and also toward the first valve member by a force weaker than a force of the first urging means;

(g) a movable member disposed between the first and second valve members and being movable along the axis, the movable member allowing the force of the first urging means to travel to the second valve member; and (h) a solenoid winding generating an electromagnetic force when electrically energized, the electromagnetic force attracting the movable member in a direction of moving the first valve member toward its closed position;

wherein when the solenoid winding is electrically de-energized, the first valve member is moved to its open position by the force of the first urging means and the second valve member is moved against the force of the second urging means to its open position by the force of the first urging means which travels to the second valve member through the movable member; and wherein when the solenoid winding is electrically energized, the first valve member is moved against the force of the first urging means to its closed position by the movable member and the second valve member is moved to its closed position by the force of the second urging means.

2. The solenoid valve of claim 1 wherein both the first and second valve members are moved to their closed positions when the solenoid winding is energized with a first preset electric current, and the first valve member remains in its open position and the second valve member is moved to its closed position when the solenoid winding is energized with a second preset electric current smaller than the first preset electric current.

3. The solenoid valve of claim 1 wherein the movable member comprises a magnetic member driven by the solenoid winding.

4. The solenoid valve of claim 1 further comprising a member defining a valve seat, the first valve member contacting the valve seat when the first valve member moves to its closed position, centering balls, and a support member supporting the first valve member and connected to the movable member via the centering balls, and wherein when the first valve member moves to its closed position and thus contacts the valve seat, the centering balls allow the first valve member to be centered with respect to the valve seat.

5. A solenoid valve comprising:
(a) a body having a first port and a second port;
(b) a first valve member movable between a first position and a second position and selectively blocking and unblocking the first port in accordance with movement of the first valve member between its first and second positions;

(c) a second valve member movable between a first position and a second position and selectively blocking and unblocking the second port in accordance with movement of the second valve member between its first and second positions;

(d) first urging means for urging the first valve member toward its first position and thereby normally holding the first valve member in its first position;

(e) second urging means for urging the second valve member toward its second position;

(f) means for allowing the first urging means to urge the second valve member toward its first position and thereby to normally hold the second valve member in its first position against a force of the second urging means;

(g) an electromagnetic actuator connected to the first valve member for moving the first valve member from its first position to its second position against a force of the first urging means; and (h) means for, when the electromagnetic actuator moves the first valve member from its first position to its second position, relieving the second valve member from the force of the first urging means and thereby allowing the second valve member to be moved from its first position to its second position by the second urging means.

6. The solenoid valve of claim 5 wherein the electromagnetic actuator comprises an armature movable between a first position and a second position, the armature being urged by the first urging means toward its first position and thus being normally held in its first position, a solenoid winding for moving the armature from its first position to its second position against the force of the first urging means, and means for supporting the first valve member on the armature and thereby allowing the first valve member to move together with the armature, wherein when the armature is in its first position, the armature abuts the second valve member and holds the second valve member in its first position by the force of the first urging means against the force of the second urging means, wherein when the solenoid winding moves the armature from its first position to its second position, the second valve member is allowed to move from its first position to its second position by the second urging means, and wherein the armature is included also in the force-relieving means.

7. The solenoid valve of claim 5 further comprising a member defining a valve seat, the first valve member contacting the valve seat when the first valve member moves to its second position, and means for centering the first valve member with respect to the valve seat when the first valve member moves to its second position.

* * * * *